Sept. 12, 1933.  I. B. NIELSEN  1,926,398
COMBINATION LOW AND HIGH PRESSURE GREASE GUN
Filed June 13, 1932  2 Sheets-Sheet 1
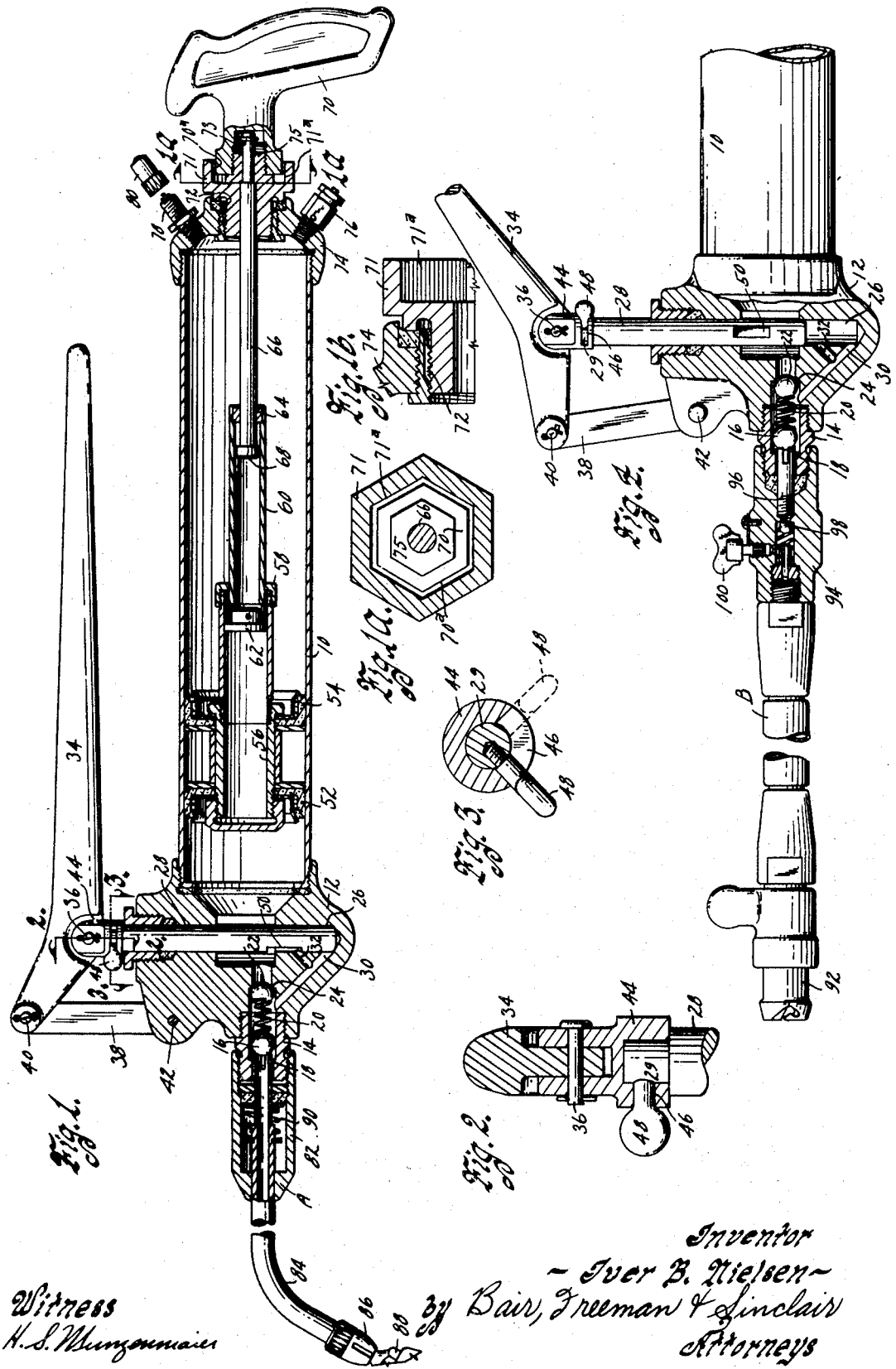
Inventor
Iver B. Nielsen
By Bair, Freeman & Sinclair
Attorneys
Witness
H. S. Wunzenmaier Sept. 12, 1933.  I. B. NIELSEN  1,926,398
COMBINATION LOW AND HIGH PRESSURE GREASE GUN
Filed June 13, 1932   2 Sheets-Sheet 2
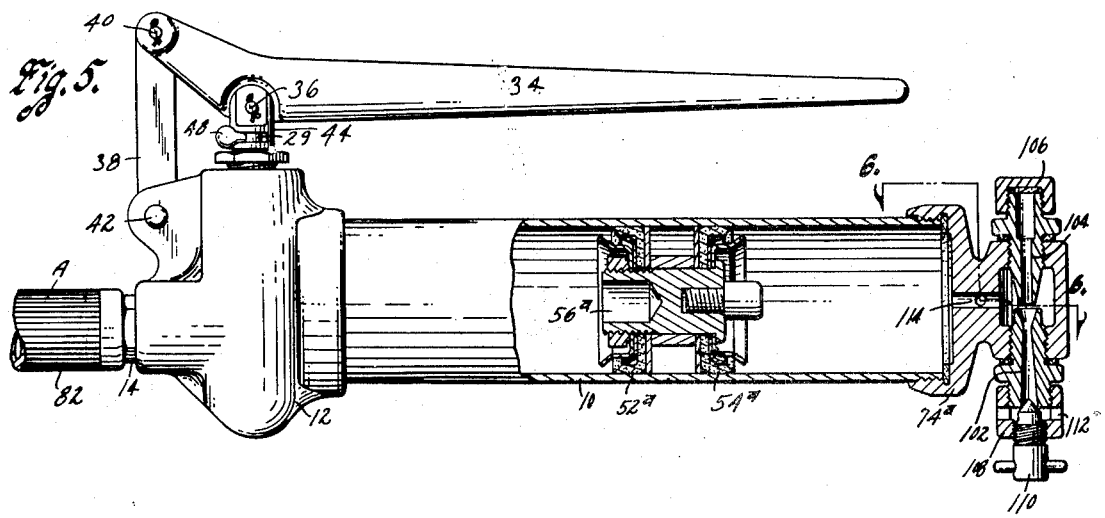
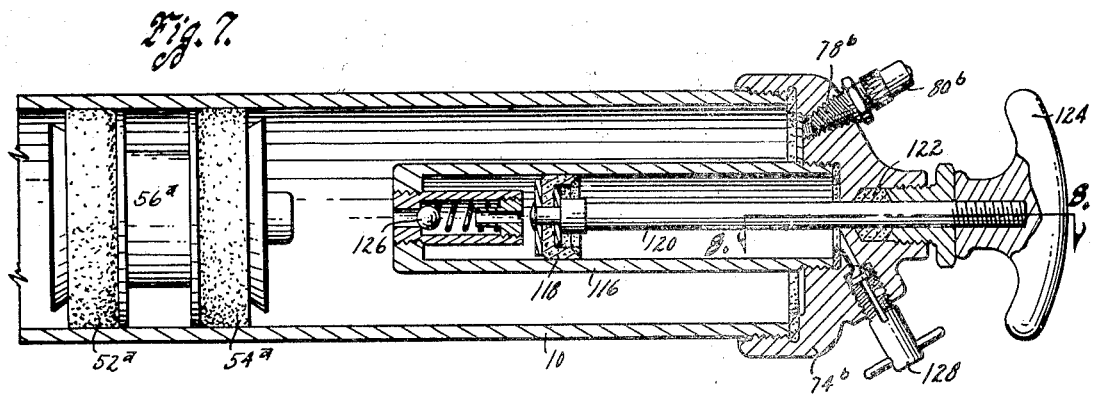
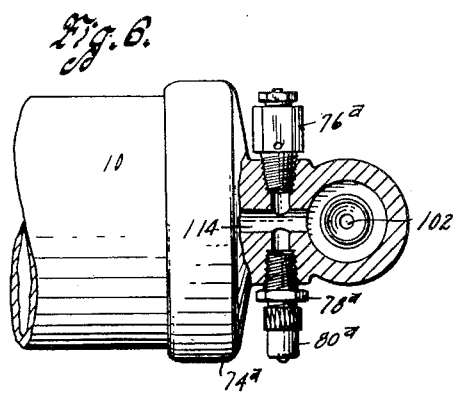
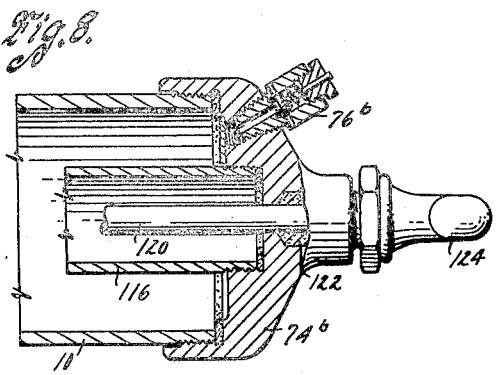
Inventor
Iver B. Nielsen
by Baur, Freeman & Sinclair
Attorneys
Witness
H. S. Mungenmaier Patented Sept. 12, 1933

1,926,398

UNITED STATES PATENT OFFICE 1,926,398

COMBINATION LOW AND HIGH PRESSURE GREASE GUN

Iver B. Nielsen, Bryan, Ohio, assignor to The Aro Equipment Corporation, Bryan, Ohio, a corporation of Ohio Application June 13, 1932. Serial No. 616,793

10 Claims. (Cl. 221—47.3)

One object of my invention is to provide a grease gun which is of a combination low and high pressure type, it being readily operable for either low or high pressure dispensation of grease and being comparatively simple and inexpensive to manufacture.

A further object is to provide a grease gun with a means for placing grease in a reservoir under pressure so that for some bearings this pressure can be utilized to force the grease into the bearings, while in bearings which require higher pressure, a high pressure plunger may be adjusted and manipulated to force the grease at a higher pressure.

A further object is to provide a novel type grease gun of the high pressure type with means for placing the contents of the reservoir under pressure and mechanism adjustable to allow utilization of such pressure to force grease from the gun.

A further object is to provide adjusting mechanism selectively positionable to allow the low pressure operation to occur or permit of high pressure operation by reciprocating a pump plunger.

Still a further object is to provide a check valve at the discharge end of the gun to normally prevent low pressure operation which would cause leaking of the gun when not in use and to provide novel engaging fittings adapted for opening this valve when it is desired to perform a greasing operation.

Still a further object is to provide novel means for placing the contents of the reservoir under pressure and for retracting the plunger when it is desired to refill the reservoir.

Still another object is to provide for reducing the pressure in the reservoir to a vacuum so that the reservoir can be refilled on account thereof.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a longitudinal sectional view through a grease gun embodying my invention.

Figure 1a is a sectional view on the line 1a—1a of Figure 1.

Figures 2 and 3 are sectional views on the lines 2—2 and 3—3 of Figure 1 showing details of an adjusting mechanism for selective low and high pressure, the parts being shown on an enlarged scale.

Figure 4 is a sectional view similar to Figure 1, showing a different type of lubricant fitting engager and the parts of the gun adjusted to a different position.

Figure 5 is a side elevation, partly in section, of a modified form of construction.

Figure 6 is a sectional view on the line 6—6 of Figure 5.

Figure 7 is a sectional view of still another modified form of construction; and Figure 8 is a sectional view on the line 8—8 of Figure 7.

On the accompanying drawings I have used the reference numeral 10 to indicate a grease reservoir or cylinder. A head 12 is provided on one end of the cylinder 10 and terminates in a discharge nozzle 14. Within the nozzle 14 a ball valve 16 is normally held seated against a valve seat 18 by a spring 20. The spring 20 also holds an intake check valve 22 against its seat 24.

Within the head 12 a high pressure cylinder 26 is provided, a plunger 28 being reciprocable and rotatable therein. Passageways 30 and 32 communicate with the cylinder 26 and the spring in the discharge fitting 15 between the balls 16 and 20.

A hand lever 34 is provided for reciprocating the plunger 28. It is pivoted to the plunger by a pin 36 and to a link 38 by a pin 40. The link 38 is pivoted by a pin 42 to the cylinder head 12.

Referring to Figures 1, 2 and 3 the upper end of the plunger 28 is reduced as indicated at 29. The reduced end 29 extends into a forked fitting 44 which is pivoted to the pin 36 and straddles the lever 34. The fitting 44 is provided with a peripheral slot 46 through which a knob 48 is radially movable. The knob is connected with the plunger 28 for reciprocating the same for the purpose of causing a milled slot 50 thereon to register with the passageway 32 as shown in Figure 1 or not register therewith because of being turned a quarter turn therefrom as shown in Figure 4. Thus the plunger 28 acts as a valve as will hereinafter be more fully disclosed.

Within the grease cylinder or reservoir 10, I provide a grease piston 52 and a compressed air piston 54. These are connected together by a tube 56 having a head 58. A tube 60 telescopically extends through the head 58 and has a shoulder 62 for engaging the head. The tube 60 has a head 64. A piston rod 66 extends through the head 64 and has a head 68 for engaging it. The outer end of the piston rod 66 has a collar 75 thereon. The piston rod 66 extends through a removable nut 71 and is an air tight press fit therein. The outer end of the rod extends into a socket of a handle 70 and has a collar 73 therein. The collar 73 is retained in the socket of the handle by a nut 75. The nut 71 has an air release groove 72 and an angular interior wall 71a. The handle has a similarly angular head 70a.

Associated with the head 74 is a safety valve 76 which is shown in detail in Figure 8. Also associated therewith is an intake check valve 78 of the ordinary type used on automobile tires. A removable cap 80 is provided therefor.

For connection with the discharge fitting 14, I provide lubricant fitting engaging members A and B. The member A comprises a sleeve 82 and a tube 84 telescopically associated therewith. An end fitting 86 of the tube 84 is adapted to engage a lubricant reception fitting 88. The inner end of the tube 84 is adapted to engage the ball 16 and raise it from its seat 18 when the parts are in their contracted position as shown in Figure 1. A spring 90 within the sleeve 82 normally tends to extend the tube 84 relative to the sleeve so that normally the valve 16 will remain closed.

The member B is a flexible hose connection having a lubricant fitting engager 92 and a fitting 94 for connection with the discharge fitting 14. The fitting 94 has therein a tube 96 adapted to open the valve 16 whenever the fitting 94 is in installed position. A check valve 98 within the fitting 94, however, normally prevents grease from flowing through the hose B.

When the hose is connected with a lubricant fitting and grease under high pressure has been introduced into the fitting it is difficult to release the fitting 92 from the grease receiving fitting and therefore a release valve 100 is provided.

In Figure 5 I have shown a different reservoir construction. The parts 58 to 72 inclusive are omitted, and in place of the parts 52, 54 and 56, similar parts 52a, 54a and 56a are substituted. In place of the parts 74 to 80 inclusive, I provide the following described mechanism:

A head 74a is provided with which a Venturi fitting 102 having a Venturi passageway is associated. A nozzle 104 is provided for discharging compressed air through the Venturi fitting 102. A cap 106 is illustrated on the fitting 104 and this is removed whereupon a compressed air hose may be connected with the fitting for operating the Venturi mechanism.

A cap 108 is provided on the Venturi fitting 102 and a valve plug 110 is screw threaded therein for seating against the Venturi fitting. Discharge openings 112 are provided in the cap 108.

The head 74a is provided with a passageway 114 communicating with the interior of the cylinder 10. As shown in Figure 6, a safety valve 76a and an intake check valve 78a provided with a cap 80a communicate with the passageway 114.

In Figure 7 I again show the pistons 52a and 54a connected by a member 56a, but I show a different head 74b on the cylinder 10. The head 74b is provided with a safety valve 76b and an intake valve 78b capped by a cap 80b. Extending inwardly from the head 74b I provide a vacuum cylinder 116. Within the cylinder 116 a piston 118 is reciprocable and has a stem 120 extending through packing 122 in the head 74b. A handle 124 is secured to the outer end thereof.

In the inner end of the cylinder 116 I provide an intake check valve 126. In the head 74b I provide a release valve 128 which permits air to be pumped out of the cylinder 116 when the the release valve is open and when the handle 124 is pulled outwardly.

Practical operation

In the operation of either type of grease gun illustrated air under pressure is utilized in the cylinder 10 to place the grease supply in front of the piston 52 under pressure. The air is introduced by applying a tire chuck to the valve 78, 78a or 78b as the case may be, when the cap thereon is removed. To avoid excessive pressure the safety valves 76, 76a and 76b are used, which will pop open when the pressure is sufficient to open the ball in the safety valve against the action of the spring thereagainst.

When it is desired to perform a lubricating operation the fitting 86 in Figure 1 is applied to the fitting 88 and the parts telescoped against the action of the spring 90 to the position shown. With the plunger 28 having the milled slot 50 thereon adjusted to the position shown it acts as a by-pass valve and the air pressure behind the piston 54 will force grease through the passageways 32 and 30 which then act as a by-pass passageway to the tube 84. If this pressure is insufficient to properly lubricate the bearing, higher pressure may be exerted by adjusting the knob 48 to the dotted line position of Figure 3 and the full line position of Figure 4, whereupon the handle 34 may be reciprocated for causing the plunger 28 to first draw lubricant through the check valve 22 into the passageway 30 and the cylinder 26 and then expel the lubricant past the valve 16.

Thus the gun is a combination low and high pressure gun and may be used as a low pressure gun when possible and as a high pressure gun when desirable.

After the lubricating operation, withdrawal of the fitting 86 from the fitting 88 will permit the spring 90 to extend the tube 84 relative to the sleeve 82 and the spring 20 to seat the valve 16.

The hose fitting B of Figure 4 is used only for high pressure work. The valve 98 normally holds the grease against the action of the compressed aid of the piston 54 so that there will not be a gradual leak of grease from the fitting 92 when the device is not in use.

I have shown different methods of retracting the plunger 52 when it is desired to draw in grease for replenishing the supply in the reservoir 10. In the refilling operation the fitting 82, or 94, is removed and the fitting 14 thrust into the supply of grease with the plunger 28 adjusted to the position shown in Figure 1. When the piston 52 is then retracted grease is drawn in past the check valve 16 through the passageways 30 and 32 into the cylinder 26 and then into the cylinder 10.

In refilling the reservoir of Figure 1, the handle 70, which is loose on the piston rod 66 so that it will hang in the proper position when the gun is on a display rack, is rotated to a position with the head 70a in registry for entering the socket 71a and the handle is then pushed in. It is then rotated so as to act as a wrench to unscrew the nut 71. As soon as the nut is off its gasket, compressed air will be released from the cylinder 10 behind the piston 54 therein. The nut 71 is then completely unscrewed and with the fitting 14 in the supply of grease the handle 70 is pulled outwardly. This pulls the piston 52 outwardly for drawing a supply of grease into the cylinder 10.

After the cylinder is filled, the piston rod 66 and the tube 60 are collapsed by pushing the handle 70 inwardly and then the nut 71 is screwed into position. A tire chuck is then applied to the valve 78 for replenishing the supply of compressed air behind the piston 54 for low pressure operation of the gun.

To refill the type of gun shown in Figures 5 and 6 the release valve 110 is first opened for allowing compressed air to escape from behind the piston 54a. A compressed air hose is then connected with the fitting 104 after the cap 106 is removed. When the air is turned on, the discharge of air through the Venturi of the fitting 102 will create a vacuum in the cylinder 10 behind the piston 54a for retracting it. After it has been fully retracted the valve 110 is closed and the cap 106 is screwed back into position.

A tire chuck is then applied to the valve 78a for replenishing the supply of air in the cylinder 10, until the safety valve 76a opens.

To refill the type of device shown in Figures 7 and 8 the cap 80b may be removed and the valve 78b opened to release the compressed air. The release valve 128 is then opened whereupon the piston 118 may be reciprocated for drawing air from the cylinder 10 into the cylinder 116.

On the downward stroke of the piston 118 air passes by the cup leather thereof and on the upward stroke this air is discharged past the release valve 128. When the piston 54a has been withdrawn as far as possible the valve 128 is closed and the compressed air supply may be replenished in the cylinder 10 through the valve 78b. Again the safety valve 76b serves to indicate when the desired maximum pressure is reached.

I have provided a grease gun which can normally be used as a low pressure gun without manual manipulation of any pump, but which can, when it is necessary be used as a manual pump for increasing the pressure and thus providing high pressure lubrication. I have also designed the high pressure mechanism so that it can be adjusted to control the low pressure operation of the gun.

Some changes may be made in the construction and arrangement of the parts of my device without departing from the real spirit and purpose of my invention, and it is my intention to cover by my claims any modified forms of structure or use of mechanical equivalents, which may be reasonably included within their scope.

I claim as my invention:

1. In a grease gun adapted for the discharge of grease at either a high or low pressure, a grease reservoir, a discharge nozzle, a spring closed check valve in said discharge nozzle, pressure means for maintaining the grease within the reservoir under pressure sufficient to allow its movability directly through the discharge nozzle and by-passing said check valve and means for imparting to the grease a relatively high pressure in addition to said first pressure means to draw it through said check valve and force it through said nozzle.

2. In a grease gun adapted for the discharge of grease at either a high or low pressure, a grease reservoir, a discharge nozzle, a spring closed check valve in said discharge nozzle, pressure means for maintaining the grease within the reservoir under pressure sufficient to allow its movability directly through the discharge nozzle and means selectively operable for imparting to the grease a relatively high pressure in addition to said first pressure means to both draw it through said check valve and force it through said nozzle.

3. In a grease gun of the class described, a grease reservoir, a discharge nozzle communicating therewith, means for placing the contents of said grease reservoir under pressure to expel the contents from the reservoir and directly through the nozzle, a high pressure booster mechanism between said grease reservoir and said nozzle and including a cylinder, a plunger reciprocable therein and a check valve, normally closed passageway means for grease from said reservoir to pass by both said pressure booster mechanism and said check valve, said plunger being rotatable to a position opening said passageway means.

4. In a grease gun, a grease reservoir comprising a cylinder, a piston therein, a discharge nozzle on one end of said cylinder, a head on the other end thereof, a Venturi fitting communicating with the space in said cylinder between said piston and said head and means for discharging fluid pressure through said Venturi fitting.

5. In a grease gun, a grease reservoir comprising a cylinder, a piston therein, a discharge nozzle on one end of said cylinder, a head on the other end thereof, a Venturi fitting communicating with the space in said cylinder between said piston and said head, means for discharging fluid pressure through said Venturi fitting and a release valve associated with such space.

6. In a grease gun, a grease reservoir comprising a cylinder, a piston therein, a discharge nozzle on one end of said cylinder, a head on the other end thereof, a Venturi fitting communicating with the space in said cylinder between said piston and said head, means for discharging fluid pressure through said Venturi fitting and means for closing said venturi and the passage for such fluid pressure and for introducing compressed air into such space.

7. In a grease gun, a grease reservoir comprising a cylinder, a piston therein, a discharge nozzle on one end of said cylinder, a head on the other end thereof and a vacuum pump associated with the space in said cylinder between said piston and said head.

8. In a grease gun, a grease reservoir comprising a cylinder, a piston therein, a discharge nozzle on one end of said cylinder, a head on the other end thereof, a vacuum pump associated with the space in said cylinder between said piston and said head and a release valve communicating with the discharge side of said vacuum pump.

9. In a grease gun, a grease reservoir cylinder, a piston therein, a discharge nozzle communicating with one end of said cylinder, a closure element for the other end of said cylinder and a vacuum pump communicating with the space in said cylinder between said piston and said closure element.

10. In a grease gun, a grease reservoir cylinder, a piston therein, a discharge nozzle communicating with one end of said cylinder, a closure element for the other end of said cylinder, a vacuum pump communicating with the space in said cylinder between said piston and said closure element and a release valve communicating with the discharge side of said vacuum pump.

IVER B. NIELSEN.